(12) United States Patent
Ceekala et al.

(10) Patent No.: US 9,363,067 B2
(45) Date of Patent: Jun. 7, 2016

(54) DATA SIGNAL TRANSCEIVER CIRCUITRY FOR PROVIDING SIMULTANEOUS BI-DIRECTIONAL COMMUNICATION VIA A COMMON CONDUCTOR PAIR

(71) Applicant: National Semiconductor Corporation, Santa Clara, CA (US)

(72) Inventors: Vijaya G. Ceekala, San Jose, CA (US); Qingping Zheng, Saratoga, CA (US); Min Du, Campbell, CA (US); Xin Liu, Mountain View, CA (US); Chandrakumar R. Pathi, San Jose, CA (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 0 days.

(21) Appl. No.: 14/582,911

(22) Filed: Dec. 24, 2014

(65) Prior Publication Data
US 2015/0188689 A1    Jul. 2, 2015

Related U.S. Application Data

(63) Continuation of application No. 13/045,301, filed on Mar. 10, 2011, now Pat. No. 8,923,166.

(60) Provisional application No. 61/312,419, filed on Mar. 10, 2010.

(51) Int. Cl.
| | |
|---|---|
| *H04L 5/14* | (2006.01) |
| *H04L 25/49* | (2006.01) |
| *H04L 29/08* | (2006.01) |
| *H04L 25/02* | (2006.01) |

(52) U.S. Cl.
CPC ............ *H04L 5/1415* (2013.01); *H04L 5/1461* (2013.01); *H04L 25/4904* (2013.01); *H04L 67/12* (2013.01); *H04L 25/0276* (2013.01); *H04L 25/0284* (2013.01); *H04L 25/0296* (2013.01); *H04L 25/0298* (2013.01)

(58) Field of Classification Search
None
See application file for complete search history.

(56) References Cited

U.S. PATENT DOCUMENTS

| | | | |
|---|---|---|---|
| 2003/0204393 A1 | 10/2003 | Czerwiec et al. | |
| 2004/0105503 A1 | 6/2004 | Mohamadzade | |
| 2004/0248613 A1* | 12/2004 | Gorcea | H04L 27/0002 455/551 |
| 2005/0249245 A1* | 11/2005 | Hazani | H04L 5/06 370/485 |
| 2006/0092967 A1* | 5/2006 | Bergeron | H04L 12/2801 370/463 |
| 2009/0080346 A1 | 3/2009 | Powell et al. | |
| 2009/0202241 A1* | 8/2009 | Yu et al. | 398/58 |
| 2009/0202246 A1* | 8/2009 | Kashima | H04H 20/69 398/77 |

OTHER PUBLICATIONS

PCT Search Report (PCT/US2011/027965), file Reference No. 11461027584.
PCT/US2011/027965 Written Opinion of the International Searching Authority, mailed Nov. 16, 2011.

* cited by examiner

*Primary Examiner* — Andrew Lai
*Assistant Examiner* — Jamaal Henson
(74) *Attorney, Agent, or Firm* — Andy Viger; Frank D. Cimino (57) ABSTRACT

Interface circuitry and method for transmitting and receiving downstream and upstream data signals simultaneously via a common conductor pair. The composite signal containing the downstream and upstream data signal components being conveyed by the common conductor pair is isolated, e.g., via signal filtering or buffering, and combined with an appropriately scaled inverse replica of the outgoing upstream data signal to subtract out upstream data signal components and thereby provide the downstream data signal substantially free of any upstream data signal components.

17 Claims, 5 Drawing Sheets

DATA SIGNAL TRANSCEIVER CIRCUITRY FOR PROVIDING SIMULTANEOUS BI-DIRECTIONAL COMMUNICATION VIA A COMMON CONDUCTOR PAIR

RELATED APPLICATION DATA

This application is a Continuation Patent Application which claims priority to U.S. Nonprovisional Patent Application No. 13/045,301, filed Mar. 10, 2011 (now U.S. Patent 8,923,166), which is a Nonprovisional based on and claiming priority from U.S. Provisional Application No. 61/312,419, filed Mar. 10, 2010.

BACKGROUND

High speed audio/video communication systems involve point-point links for high-speed data transfer from a data source such as a camera or a video player and a display. These systems require dedicated point-point links to transfer video data while requiring one or more separate physical links to transfer control information back to the source. The configuration data is usually sent to provide control information for the cameras like zoom, tilt, etc.

One area in which such systems are seeing increasing use is that of automotive media communications for the front seat or dashboard (such as rear/side cameras) and rear seat (such as a DVD player). What is needed is both display data in one direction, and bi-directional control (e.g., camera tilt/zoom and DVD control player). One conventional communication link uses five wire pairs (three for data, one for a clock and one for control). Another conventional communication link uses two wire pairs (one for data with an embedded clock and one for control).

An exemplary application is a communication link between a rear view camera and dashboard display. The camera communicates rear view video data to the dashboard display over the forward channel. Control commands, e.g., pan, tilt or zoom, are communicated back to the camera over the back channel by being modulated onto the forward channel. The camera responds with an acknowledgement signal (ACK) via the forward channel control frame.

In the context of automotive infotainment system, a control channel is primarily used in two cases: safety and driver assist systems, and rear seat entertainment systems.

In safety and driver assist systems, a forward channel carries data from a camera to a head unit for further image processing. A control channel carries management data back from the head unit to camera. Typical control commands include commands to control the camera, e.g., pan, tilt, zoom, etc. A conventional system like this uses two pairs of wires, one for carrying high-speed forward channel data and the other to carry control information.

In rear seat entertainment systems, the forward channel carries high-speed data such as high definition (HD) video from a DVD or Blu-Ray player. The control channel is used to exchange keys for content protection and display aspect ratio information with the video source for automatic video formatting.

Typical figures of merit for evaluating the efficiency of a control channel are latency, electromagnetic interference (EMI) and number of cables and connectors. Regarding latency, in driver assist applications where detecting any obstructions on the road in the front or to the rear of a car or when developing lane-departure warning systems, control channel latency is a very important factor as an evasive action is required to be taken in time to prevent any accidents or injuries. Regarding EMI, automotive systems have stringent emissions specifications. High full-swing TTL/CMOS levels that go around wires inside an automobile can create strong EMI issues that can interfere with other electronic systems that control engine operation. Regarding the number of cables and connectors, a large number of cables and connectors add weight and costs.

Three types a control channel architectures have been used: separate wires, blanking transmission and common-mode modulation. Regarding separate wires, control channel information is transferred via a separate wire or cable. While this offers very good latency, digital switching transients add to EMI and the need for extra cable and connectors adds weight and costs.

Figure 1:
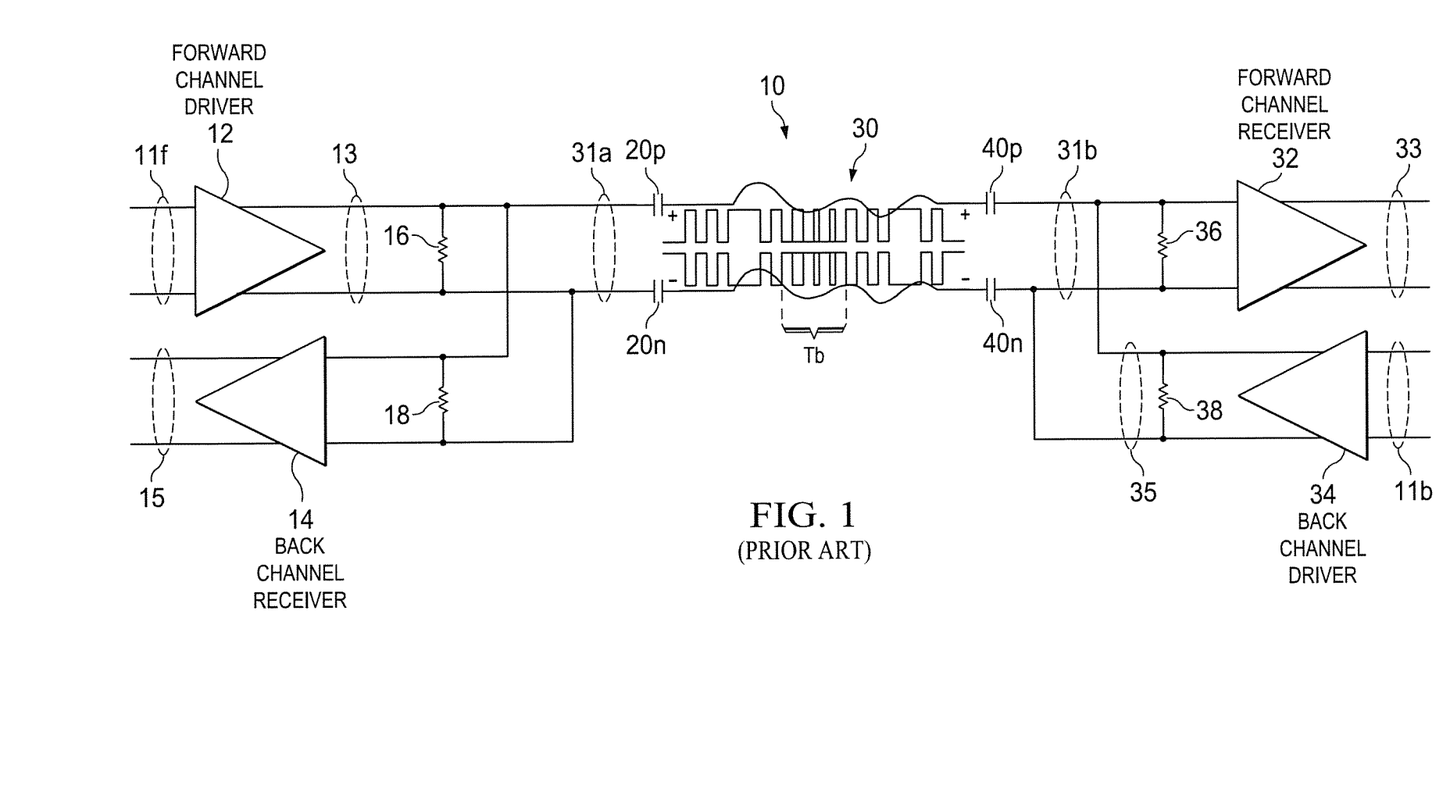
FIG. 1 is a functional block diagram of a conventional system providing bi-directional communication via a common conductor pair using blanking transmission.

Referring to FIG. 1, a conventional embodiment of such a bi-directional communication link 10 includes a forward channel driver 12, a back channel receiver 14, a forward channel receiver 32 and a back channel driver 34, all interconnected substantially as shown. In accordance with well known techniques, the differential forward channel signal 11$f$ is amplified by the forward channel driver 12 to provide the differential forward channel signal 13 across a termination resistance 16 for coupling via coupling capacitors 20$p$, 20$n$ to the differential signal line 30. At the other end, the signal is further coupled via coupling capacitances 40$p$, 40$n$ to a termination resistance 36, following which the forward channel signal is amplified by the forward channel receiver 32 to provide the forward channel data signal 33 for downstream processing (not shown).

In the other direction, the back channel driver 34 receives the differential back channel signal 11$b$, and amplifies it to provide the back channel transmission signal across its termination resistance 38 for coupling to the differential signal line 30 by the coupling capacitors 40$p$, 40$n$. The back channel signal, coupled by the upstream coupling capacitors 20$p$, 20$n$, is received across a termination resistance 18 and amplified by the back channel receiver 14 to provide the back channel data signal 15.

As noted above, one technique relies on so-called "blanking transmission", in which the back channel data is modulated into blanking intervals, e.g., vertical or horizontal blanking intervals of forward channel video data. For example, as depicted here, the back channel data pulses are inserted within the vertical blanking interval Tb as a time-domain multiplexed data signal. While this can be a reasonable solution to operate with a single cable, e.g., a common conductor pair, overall signal latency is increased, since blanking intervals are only available once every video frame. Depending upon the type of data being transmitted or the application, this can be a relatively long time interval and make a significant difference, e.g., in an accident scenario where detection and response time in microseconds are required.

Figure 2:
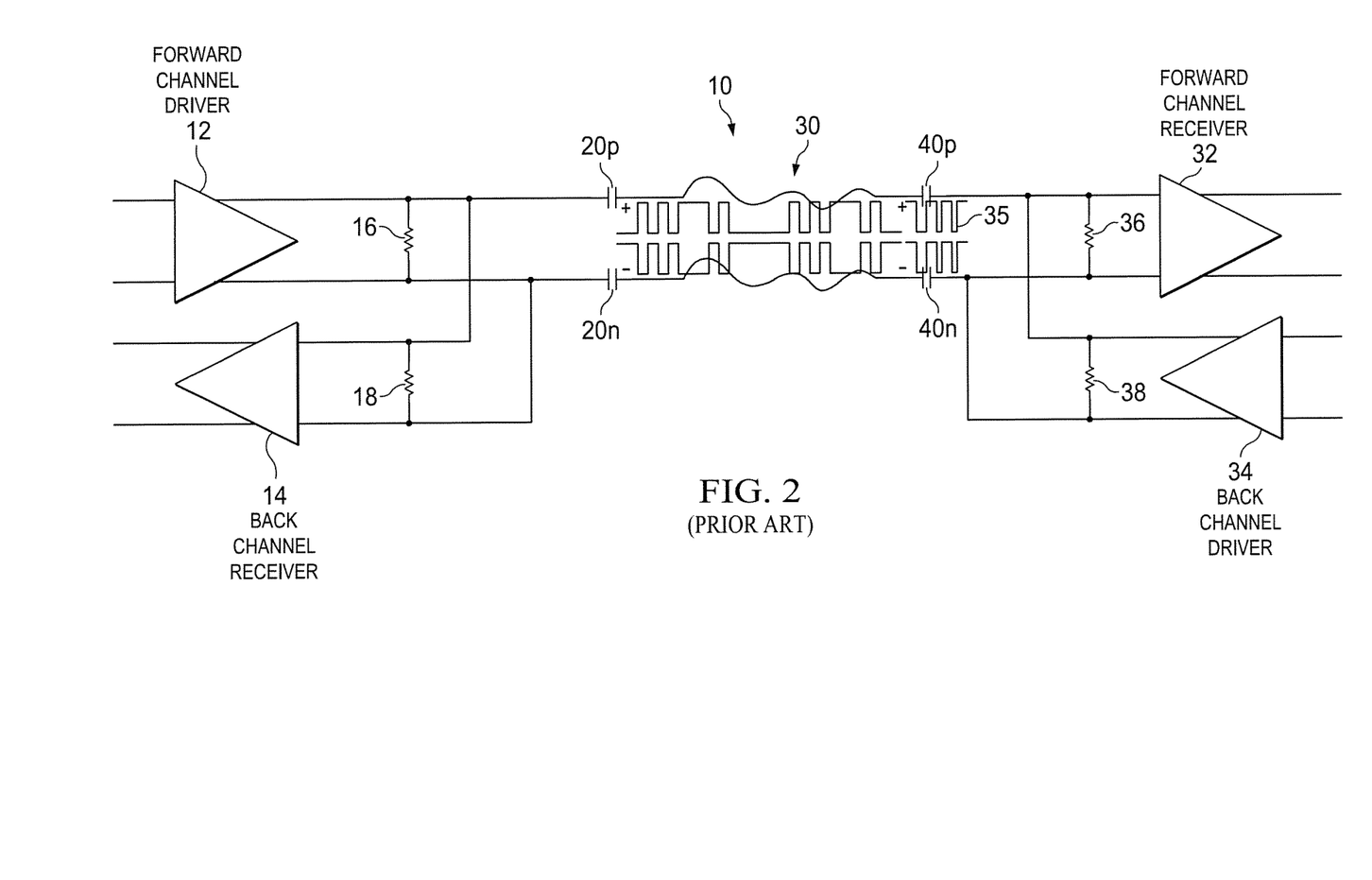
FIG. 2 is a functional block diagram of a conventional system providing bi-directional communication via a common conductor pair using common-mode modulation.

Referring to FIG. 2, another technique relies upon common-mode modulation, where back channel data, e.g., control information, is conveyed via the same conductor pair using common-mode modulation. Since the forward channel data is transmitted differentially, common-mode modulation in the reverse direction will, ideally, not interfere with the forward channel data transmission. The back channel data pulses 35 are modulated at a common mode potential on both conductors of the conductor pair 30. While this is advantageous in terms of signal latency and costs (i.e., in terms of requiring fewer conductors), such technique has increased EMI due to common-mode signal spikes. This can result in otherwise problematic restrictions on the design of the forward channel receiver 32, particularly in terms of its common-mode signal rejection.

Accordingly, it would be beneficial to have a technique for providing simultaneous bi-directional communication via a common conductor pair while minimizing signal latency, EMI and the number of conductors required.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks may be implemented in a single piece of hardware As an overview, in accordance with exemplary embodiments of the presently claimed invention, a system and method are provided for simultaneous bi-directional data transfer in which one physical link can be used to transfer high-speed audio/video data as well as two virtual channels that allow transfer of configuration and other control information simultaneously. This saves the need for extra cable pairs and consequently reduces overall system cost. Additionally, this reduces the overall weight of the hardware used to connect the infotainment system and improves the fuel economy in a weight-sensitive system like automotive vehicles.

The basic simultaneous bi-directional communication link in accordance with exemplary embodiments of the presently claimed invention uses a single physical media channel (e.g., a twisted wire pair) that carries both data and bi-directional control signals, e.g., high speed (gigabit-per-second) forward channel for data and control (from source to head end), and lower speed (megabit-per-second) back channel for control (from head end to source). The forward channel is segregated into sequential data and forward control frames, while, according to an aspect of the invention, the back channel carries back control modulated onto the forward channel using a coding scheme, preferably with no DC component (e.g., Manchester code). To ensure that there is no baseline wander due to the presence of AC coupling capacitors, the back channel data is encoded using a coding scheme with no DC component, such as Manchester code, and the forward channel data is encoded using DC-balanced coding, such as 8$b$/10$b$ encoding, of which both types, as well as others, are well known in the art.

Figure 3:
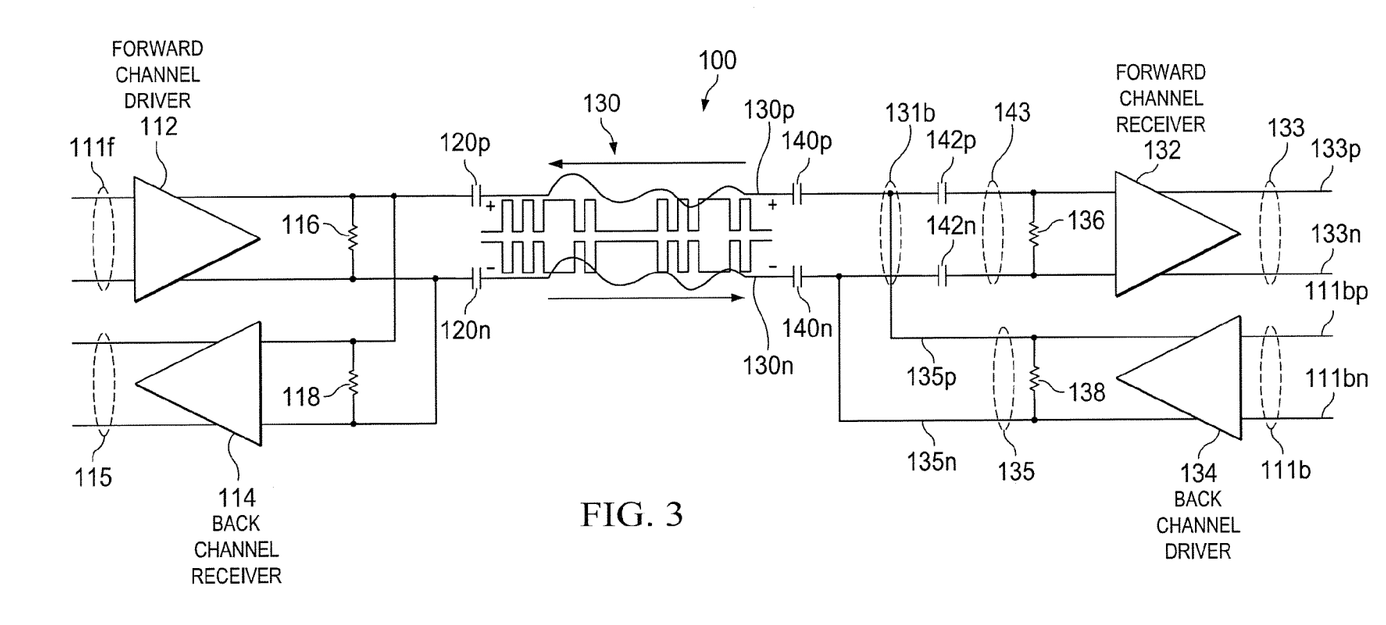
FIG. 3 is a functional block diagram of a system using data signal transceiver circuitry for providing simultaneous bi-directional communication via a common conductor pair in accordance with one embodiment of the presently claimed invention.

Referring to FIG. 3, a communication system 100 using data signal transceiver circuitry in accordance with one embodiment of the presently claimed invention includes a forward channel driver 112, back channel receiver 114, forward channel receiver 132 and back channel driver 134, all interconnected substantially as shown, similar to the circuits of FIGS. 1 and 2 (hence, the use of related numerical element identifiers). However, as discussed in more detail below, in addition to the upstream and downstream coupling capacitors 120$p$, 120$n$, 140$p$, 140$n$, additional coupling capacitors 142$p$, 142$n$, are used in series with the downstream coupling capacitors 140$p$, 140$n$ to provide high pass frequency filtering of the signal components being coupled from and to the cable 130 and forming the composite signal 131$b$.

The forward channel signal, as provided by the forward channel driver 112, is at a higher frequency (e.g., gigabits per second) than the back channel data signal (e.g., megabits per second), as provided by the back channel driver 134. Accordingly, the high pass filtering provided by the additional coupling capacitors 142$p$, 142$n$ beneficially assists in the removal of the back channel signal components 135 being transmitted via the cable 130 simultaneously during reception of the forward channel data signal components originating from the forward channel driver 112. As a result, the filtered forward channel data signal 143 includes reduced levels of back channel data signal components 135, which appear in the composite data signal 131$b$.

Figure 4:
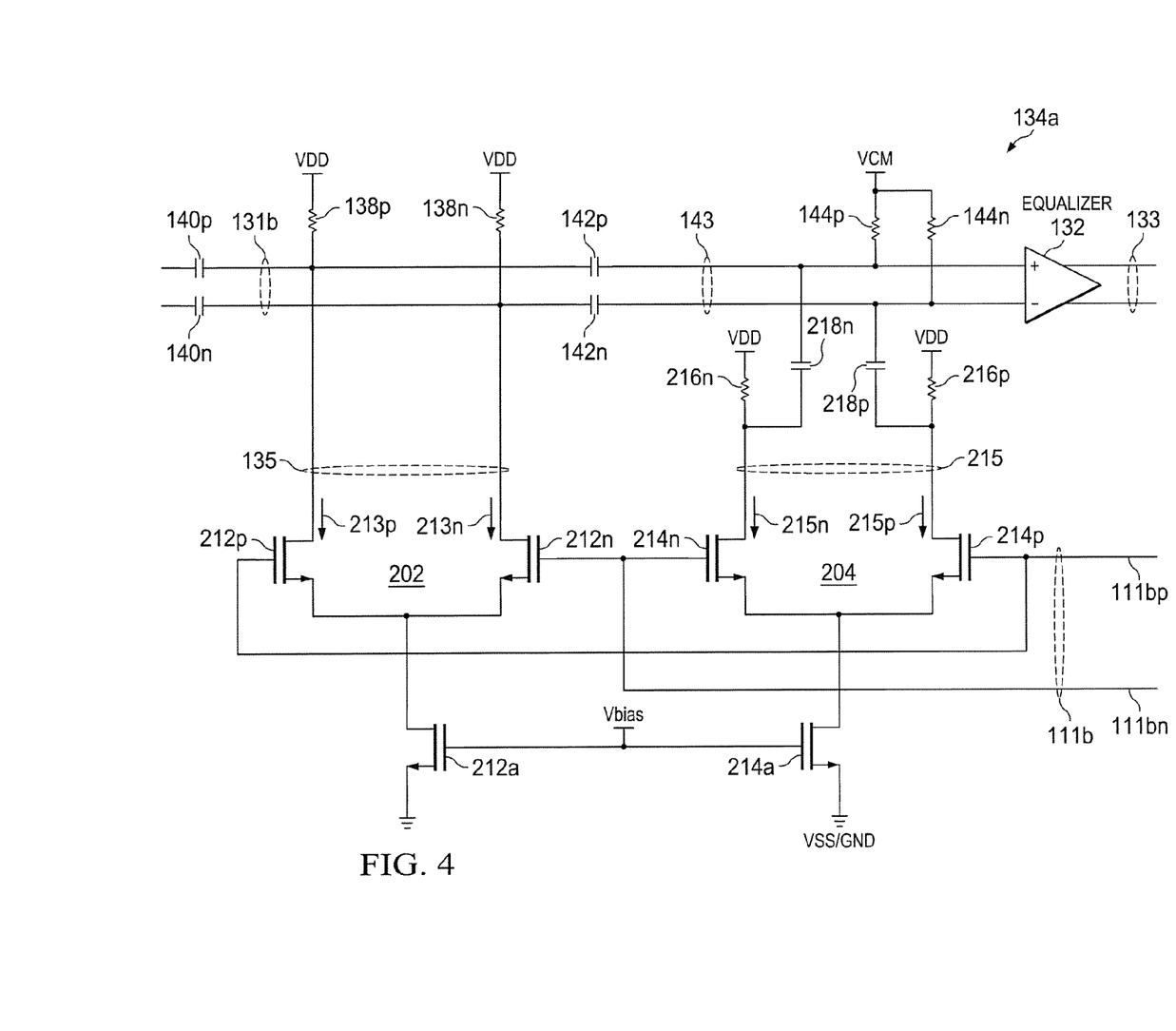
FIG. 4 is a schematic diagram of back channel driver circuitry for use in the circuit of FIG. 3.

Referring to FIG. 4, back channel driver circuitry 134$a$ in accordance with one embodiment of the presently claimed invention includes main driver circuitry 202 and replica driver circuitry 204. As discussed above, signal coupling to and from the cable 130 is provided by coupling capacitors 140$p$, 140$n$. The back channel driver circuitry 202 includes opposing transistors 212$p$, 212$n$ forming a differential amplifier biased by a tail current source transistor 212$a$, the gate electrode of which is biased by a bias voltage Vbias. (In accordance with preferred embodiments, the transistor type used is an insulated gate field effect transistor, often referred to by the acronym MOSFET for metal oxide semiconductor field effect transistor.) The gate electrodes of the amplifier transistors 212$p$, 212$n$ are driven by the positive 111$bp$ and negative 111*bn* phases of the differential back channel data signal 111*b*. The resulting transistor currents 213*p*, 213*n* produce voltages across cable termination resistors 138*p*, 138*n*, thereby producing the differential back channel data signal voltage 135, which is coupled to the cable 130 by the coupling capacitors 140*p*, 140*n*. The additional, e.g., internal, coupling capacitors 142*p*, 142*n* are substantially smaller in capacitance values, thereby providing the high pass frequency filtering that blocks most of the signal energy produced by the lower frequency back channel data signal 135.

The replica driver circuit 204 also includes opposing transistors 214*p*, 214*n* forming another differential amplifier, biased by another tail current source transistor 214*a* (also biased by the bias voltage Vbias). These transistors 214*p*, 214*n* are also driven by the positive 111*bp* and negative 111*bn* phases of the differential back channel data signal 111*b*. The resulting transistor currents 215*p*, 215*n* produce voltages across load resistors 216*p*, 216*n*, thereby generating a replica differential back channel data signal voltage 215. This replica signal 215 is coupled by additional coupling capacitors 218*p*, 218*n* (which also provide DC isolation) to the input terminals of the forward channel receiver 132. The input terminals of the forward channel receiver 132 are biased with a common-mode voltage VCM via common mode pull-up resistors 144*p*, 144*n*.

As noted above, the additional coupling capacitors 142*p*, 142*n* provide for high pass filtering of the outgoing back channel data signal 135. As a result, signal components related to the outgoing back channel data signal within the filtered differential data signal 143 are reduced in magnitude. These signal components are further reduced by the coupled replica back channel data signal 215, which is inverted relative to the outgoing back channel data signal 135. This results in a subtraction of the inverted replica back channel data signal 215 from any remnant signal components coupled by the additional in-line coupling capacitors 142*p*, 142*n*. Such subtraction, or cancellation, of coupled back channel data signal components within the filtered forward channel data signal 143 can be maximized by appropriate scaling of the dimensions of the replica amplifier transistors 214*p*, 214*n* relative to the dimensions of the back channel driver amplifier transistors 212*p*, 212*n* (e.g., by scaling their respective channel length and width dimensions in accordance with well known techniques). Additionally, current requirements for operation of the replica driver circuitry 204 can be minimized by appropriate scaling up of the replica driver load resistors 216*p*, 216*n* relative to the termination/load resistors 138*p*, 138*n* of the main back channel driver circuit 202, thereby requiring lower replica signal currents 215*p*, 215*n* as compared to the main signal currents 213*p*, 213*n*.

Figure 5:
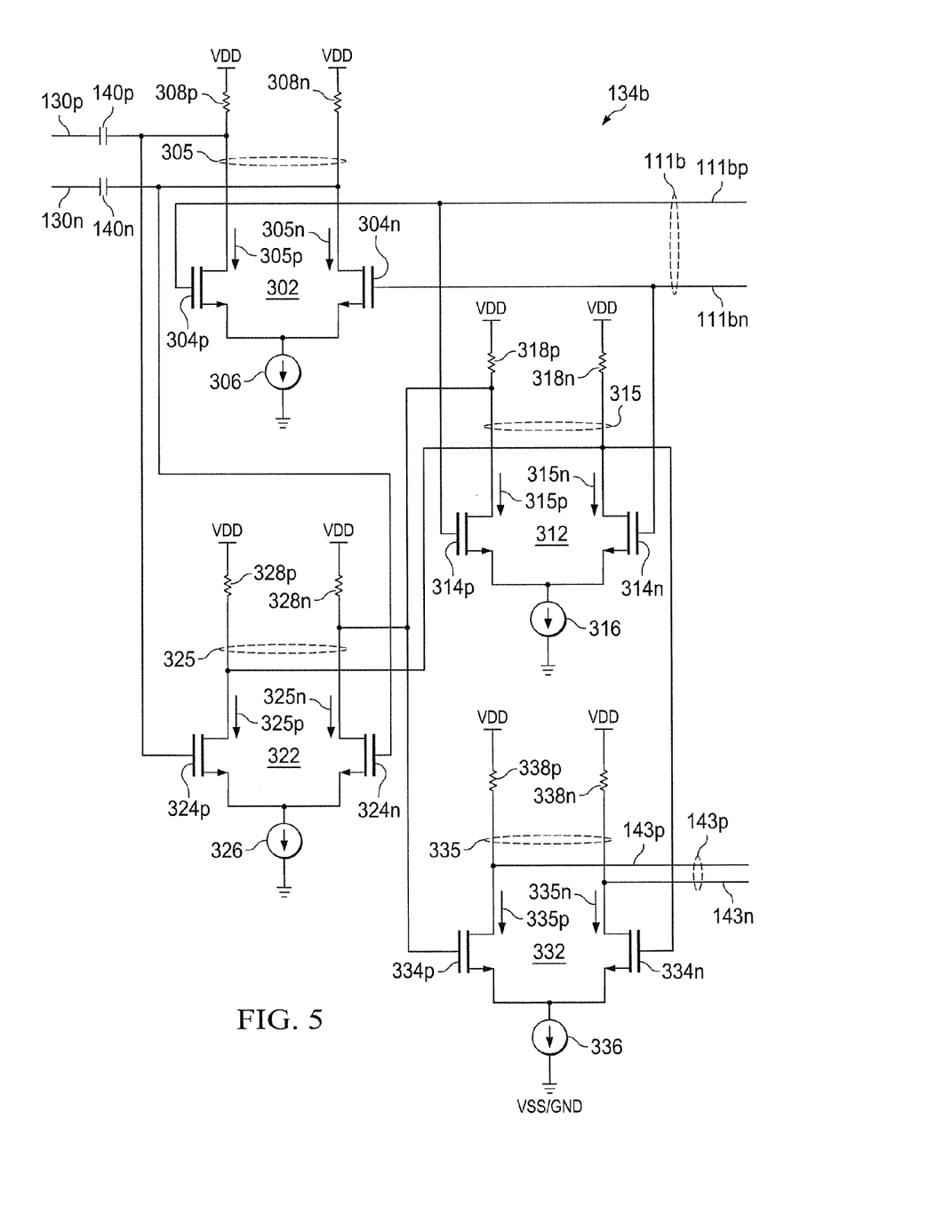
FIG. 5 is a schematic diagram of back channel driver circuitry for data signal transceiver circuitry in accordance with another embodiment of the presently claimed invention.

Referring to FIG. 5, back channel driver circuitry 134*b* in accordance with another embodiment of the presently claimed invention provides for subtraction, or nullification, of back channel data signal energy within the forward data channel signal to be processed. This is achieved by isolating the back and forward channel data signals electrically as opposed to frequency separation as in the circuit of FIG. 4. This is advantageous for those applications in which the frequency separation between the data rates of the forward and back channels (downstream and upstream data signals, respectively) is not sufficient for effective isolation by filtering as discussed above for the circuitry of FIG. 4 (as well as as cases in which the downstream and upstream data signals have similar or equal data rates). Such circuitry includes the main back channel driver circuitry 302, replica driver circuitry 312, isolation circuitry 322, and combining, or summing, circuitry 332, all interconnected substantially as shown.

The main driver circuitry 302 includes transistors 304*p*, 304*n* forming a differential amplifier with a tail current source 306 and termination/load resistors 308*p*, 308*n*. The replica driver circuitry 312 also includes a differential amplifier formed by transistors 314*p*, 314*n* with by a tail current source 316 and load resistors 318*p*, 318*n*. The isolation circuitry 322 also includes a differential amplifier formed by opposing transistors 324*p*, 324*n* with a tail current source 326 and load resistors 328*p*, 328*n*. Similarly, the combining circuitry 332 includes a differential amplifier formed by transistors 334*p*, 334*n* with a tail current source 336 and load resistors 338*p*, 338*n*.

The positive 111*bp* and negative 111*bn* phases of the back channel data signal 111*b* drive the gate electrodes of the transistors 304*p*, 304*n* of the main driver circuitry 302. This produces transistor currents 305*p*, 305*n*, which, in turn, generate voltages across the load resistors 308*p*, 308*n* to produce a differential back channel data signal 305 at the output electrodes. The current of this back channel data signal 305 combines with the current of the forward channel data signal coupled from the cable 130 by the coupling capacitors 140*p*, 140*n*. The resulting composite signal, composed of forward channel and back channel data signal components, drive the input electrodes of the isolation circuitry 322. This produces output currents 325*p*, 325*n*, which, in turn, generate voltages across the load resistors 328*p*, 328*n* and produce a differential isolated signal voltage 325 at the output electrodes.

The input electrodes of the replica driver circuitry 312 are also driven by the positive 111*bp* and negative 111*bn* phases of the back channel data signal 111*b*. This results in transistor currents 315*p*, 315*n* that generate voltages across the load resistors 318*p*, 318*n* and produce a differential signal voltage 315 at the output electrodes. The currents of these isolated 325 and replica 315 signals combine by summing at the summing nodes formed by the the mutually connected output electrodes of the isolation circuitry 322 and replica driver circuitry 312. Since the isolated signal 325 is the sum of the forward and back channel data signal components, and the replica back channel data signal 315 is an inverted version of the back channel data signal, the resulting combined signal presented at the gate electrodes of the combining circuitry transistors 334*p*, 334*n* includes the forward channel data signal components and substantially zero back channel data signal energy. As a result, the transistor currents 335*p*, 335*n* that are produced and generate voltages across the load transistors, 338*p*, 338*n* provide a differential output voltage 335 containing substantially only forward channel data signal energy.

Hence, as discussed hereinabove, forward and back channel data signals can be conveyed simultaneously in both directions of a common conductor pair by isolating the forward and back channel data signal components, either electrically or by signal frequency, and subtracting out the undesired back channel data signal components from the forward channel data signal by introducing replica back channel data signal components inverse in phase to the original components. Isolation by signal frequency can be achieved by filtering, e.g., with series coupling capacitances 142*p*, 142*n* in circuitry 134*a* such as that depicted in FIG. 4. Electrical isolation can be achieved by buffering signal voltage and/or signal current, e.g., with isolation circuitry 322 in the form of a buffer amplifier in circuitry 134*b* such as that depicted in FIG. 5.

Figure 6:
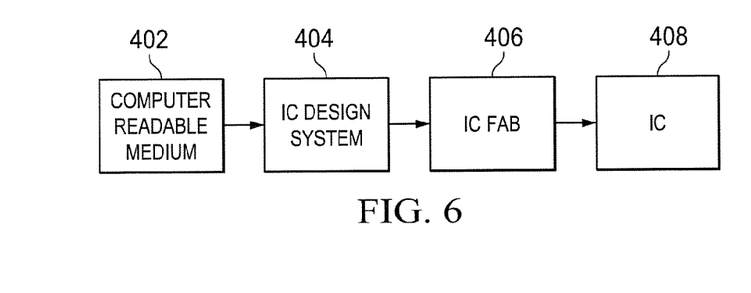
FIG. 6 is a functional block diagram of an exemplary embodiment of an integrated circuit design and fabrication system operated in accordance with computer instructions.

Referring to FIG. 6, integrated circuit (IC) design systems 404 (e.g., work stations or other forms of computers with digital processors) are known that create integrated circuits based on executable instructions stored on a computer readable medium 402, e.g., including memory such as but not limited to CD-ROM, DVD-ROM, other forms of ROM, RAM, hard drives, distributed memory, or any other suitable computer readable medium. The instructions may be represented by any programming language, including without limitation hardware descriptor language (HDL) or other suitable programming languages. The computer readable medium contains the executable instructions (e.g., computer code) that, when executed by the IC design system 404, cause an IC fabrication system 406 to produce an IC 408 that includes the devices or circuitry as set forth herein. Accordingly, the devices or circuits described herein may be produced as ICs 408 by such IC design systems 404 executing such instructions.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus suitable to receive and transmit respective forward channel and back channel data signals simultaneously through an interface to a common conductor pair, comprising:
    first and second coupling capacitors for interfacing to the common conductor pair;
    a composite differential signal path coupled through the coupling capacitors to the interface to the common conductor pair to convey forward channel and back channel data signals simultaneously as a composite data signal;
    a forward channel differential signal path coupled to receive the forward channel data signals through differential summing nodes that are isolated from said composite differential signal path, and to convey said forward channel data signals;
    forward channel receiver circuitry coupled to said forward channel differential signal path to receive said forward channel data signals;
    back channel differential signal driver circuitry coupled at a differential output to said composite differential signal path and responsive to an encoded data signal at a differential input to provide said back channel data signal; and
    isolation circuitry coupled between said composite differential signal path and said forward channel differential signal path at said differential summing nodes, to perform signal isolation to couple the forward channel data signals from said composite differential signal path to said forward channel differential signal path, through said differential summing nodes, while substantially blocking back channel data signal energy from said forward channel differential signal path, said isolation circuitry including:
        replica differential signal driver circuitry coupled at a differential output to said differential summing nodes and responsive to said encoded data signal to provide at said differential summing nodes a replica signal related to an inverse of said back channel data signal.

2. The apparatus of claim 1, wherein said forward channel data signals are transmitted at a forward channel frequency, and said back channel data signals are transmitted at a back channel frequency that is substantially less than said forward channel frequency, and wherein said isolation circuitry comprises respective filter capacitors coupled between the composite differential signal path and said forward channel signal path at said differential summing nodes, with the filter capacitors having a capacitance value substantially less than that of the first and second coupling capacitors.

3. The apparatus of claim 1, wherein said isolation circuitry comprises:
    isolation differential amplifier circuitry with differential inputs coupled to said combined differential signal path, and differential outputs coupled to said differential summing nodes, and responsive to said composite data signal to provide at said differential summing nodes an isolated signal corresponding to a buffered version of said composite data signal; and
    combining differential amplifier circuitry with differential inputs coupled to said differential summing nodes, and differential outputs coupled to said forward channel signal path, and responsive to said isolated signal and said replica signal to provide a resultant signal corresponding to said forward channel data signal.

4. The apparatus of claim 3, wherein said isolation differential amplifier circuitry comprises buffer amplifier circuitry.

5. The apparatus of claim 3, wherein said forward channel and back channel data signals have approximately equal data rates.

6. The apparatus of claim 1, wherein said forward channel and back channel data signals have forward channel and back channel data rates, respectively, and said forward channel rate is substantially greater than said back channel data rate.

7. A transceiver communication system for receiving and transmitting respectively forward channel and back channel data signals conveyed simultaneously via a common conductor pair as a composite data signal terminated at an upstream end and a downstream end by respective upstream and downstream coupling capacitors, comprising:
    an upstream transceiver and a downstream transceiver coupled respectively through the upstream and downstream coupling capacitors to the upstream and downstream ends of the conductor pair;
    the upstream transceiver circuitry including a forward channel driver and a back channel receiver respectively to transmit forward channel data signals and receive back channel data signals conveyed over the conductor pair, as the composite data signal;
    the downstream transceiver circuitry including a forward channel receiver and a back channel driver, and including
        a composite differential signal path coupled through the downstream coupling capacitors to the common conductor pair to convey forward channel and back channel data signals simultaneously as a composite data signal;
        a forward channel differential signal path coupled to receive the forward channel data signals through differential summing nodes that are isolated from the composite differential signal path, and to convey the forward channel data signals;
        said forward channel receiver coupled to the forward channel differential signal path to receive the forward channel data signals;
        said back channel differential driver coupled at a differential output to the composite differential signal path and responsive to an encoded data signal at a differential input to provide the back channel data signal;

isolation circuitry coupled between the composite differential signal path and the forward channel differential signal path at the differential summing nodes, to perform signal isolation to couple the forward channel data signals from the composite differential signal path to the forward channel differential signal path, through the differential summing nodes, while substantially blocking back channel data signal energy from the forward channel differential signal path, the isolation circuitry including a replica differential driver coupled at a differential output to the differential summing nodes, and responsive to the encoded data signal to provide at the differential summing nodes a replica signal related to an inverse of the back channel data signal.

8. The system of claim 7, wherein the forward channel data signals are transmitted at a forward channel frequency, and the back channel data signals are transmitted at a back channel frequency that is substantially less than the forward channel frequency, and wherein the isolation circuitry comprises respective filter capacitors coupled between the composite differential signal path and the forward channel signal path at the differential summing nodes, with the filter capacitors having a capacitance value substantially less than that of the first and second coupling capacitors.

9. The system of claim 7, wherein said isolation circuitry comprises:

an isolation differential amplifier with differential inputs coupled to the combined differential signal path, and differential outputs coupled to the differential summing nodes, and responsive to the composite data signal to provide at the differential summing nodes an isolated signal corresponding to a buffered version of the composite data signal;

a combining differential amplifier with differential inputs coupled to the differential summing nodes, and differential outputs coupled to the forward channel signal path, and responsive to the isolated signal and the replica signal to provide a resultant signal corresponding to the forward channel data signal.

10. The system of claim 9, wherein the isolation differential amplifier comprises a buffer amplifier.

11. The system of claim 9, wherein said forward channel and back channel data signals have approximately equal data rates.

12. The system of claim 7, wherein the forward channel and back channel data signals have forward channel and back channel data rates, respectively, and the forward channel rate is substantially greater than the back channel data rate.

13. A method of receiving and transmitting respectively forward channel and back channel data signals conveyed simultaneously as a composite data signal via a common conductor pair terminated at a downstream end with respective downstream coupling capacitors, comprising:

configuring a composite differential signal path coupled through the downstream coupling capacitors to the common conductor pair to convey the forward channel and back channel data signals simultaneously as the composite data signal;

configuring a forward channel differential signal path coupled to receive the forward channel data signals through differential summing nodes that are isolated from the composite differential signal path, and to convey the forward channel data signals;

receiving, over the composite differential signal path forward channel data signals for input to the forward channel receiver;

transmitting, over the composite differential signal path back channel data signals, generated by a back channel driver;

isolating the composite differential signal path from the forward channel differential signal path by performing signal isolation to couple the forward channel data signals from the composite differential signal path through the differential summing nodes to the forward channel differential signal path, while substantially blocking back channel data signal energy from the forward channel differential signal path, including driving into the differential summing nodes, a replica signal related to an inverse of said back channel data signal;

such that signal components of the back channel data signals that appear at the differential summing nodes are significantly reduced in the forward channel differential signal path.

14. The method of claim 13, wherein the forward channel data signals are transmitted at a forward channel frequency, and the back channel data signals are transmitted at a back channel frequency that is substantially less than the forward channel frequency, and wherein isolating the composite differential signal path from the forward channel differential signal path is accomplished with filter capacitors coupled between the composite differential signal path and the forward channel differential signal path, with the filter capacitors having a capacitance value substantially less than that of the downstream coupling capacitors.

15. The method of claim 13, wherein isolating the composite differential signal path from the forward channel differential signal path is accomplished by:

buffering said composite data signal to the differential summing nodes to provide an isolated signal corresponding to a buffered version of the composite data signal; and combining said isolated signal with said replica signal to provide a resultant signal corresponding to said forward channel data signal.

16. The method of claim 15, wherein said forward channel and back channel data signals have approximately equal data rates.

17. The method of claim 13, wherein said forward channel and back channel data signals have forward channel and back channel data rates, respectively, and said forward channel rate is substantially greater than said back channel data rate.

* * * * *